United States Patent [19]

Carter et al.

[11] Patent Number: 5,839,765
[45] Date of Patent: Nov. 24, 1998

[54] METAL SEAL RING FOR TUBULAR JOINT

[75] Inventors: Robert H. Carter; William M. Taylor; Gerald S. Baker, all of Houston, Tex.

[73] Assignee: Cooper Cameron Corporation, Houston, Tex.

[21] Appl. No.: 742,468

[22] Filed: Nov. 1, 1996

[51] Int. Cl.[6] .............................. F16L 17/08; F16L 17/10
[52] U.S. Cl. .................................. 285/334.2; 285/332.2; 285/350; 277/603; 277/608
[58] Field of Search .............................. 285/332.1, 332.2, 285/349, 334.2, 350, 917; 277/614, 603, 608, 602, 914

[56] References Cited

U.S. PATENT DOCUMENTS

| | | | |
|---|---|---|---|
| 2,614,793 | 10/1952 | Storm | 137/860 |
| 3,265,412 | 8/1966 | Reid et al. | 285/350 X |
| 3,329,447 | 7/1967 | Hitz | 285/113 |
| 4,361,331 | 11/1982 | Kohler | 285/917 X |
| 4,470,609 | 9/1984 | Poe | 285/334.2 |
| 4,474,381 | 10/1984 | Wilkens et al. | 285/14 |

*Primary Examiner*—Anthony Knight
*Assistant Examiner*—Gary Grafel
*Attorney, Agent, or Firm*—Bush, Riddle & Jackson

[57] ABSTRACT

A tubular joint has a pair of tubular members (10, 12) with end hubs (14, 16) in opposed relation and secured by a clamp (22). A primary seal ring (40) has external tapered sealing surfaces (42, 44) engaging internal tapered sealing surfaces (28, 30) on the hubs (14, 16) to provide a primary seal. Secondary sealing surfaces (32, 36) on the hubs (14, 16) are engaged by O-rings (62, 64) as shown in FIG. 4 to seal against external fluid flow to the seal ring (40). O-rings (62, 64) permit internal fluid flow outwardly from the seal ring (40) as shown in FIG. 3.

16 Claims, 2 Drawing Sheets

METAL SEAL RING FOR TUBULAR JOINT

FIELD OF INVENTION

This invention relates to joints for tubular members in end to end relation, and more particularly to a tubular joint having a separate annular gasket for sealing between the ends of the tubular members.

BACKGROUND OF THE INVENTION

Heretofore, tubular joints have been provided to connect the adjacent ends of a pair of tubular members such as casing, tubing, and pipe. The ends of the tubular members normally have enlarged diameter hubs or flanges which are positioned in end to end relation and connected by a coupling or clamp which clamps the hubs together. For sealing between the hubs, an annular gasket or seal is positioned between the hubs. As an example, U.S. Pat. No. 4,474,381 dated Oct. 2, 1984 shows a tubular joint in which a metal gasket is positioned between internal tapered surfaces on the hubs for sealing therebetween. The metal gasket has mating external tapered surfaces engaging the internal tapered surfaces on the hubs for sealing therebetween. Such a sealing arrangement has been found to be very effective for sealing against internal pressure within the tubular members.

In subsea operations today for oil and gas wells, subsea completions at the sea floor are at increasing water depths with many completions between about four thousand feet (4,000) and eight thousand (8,000) feet of depth. Exploratory wells at water depths of ten thousand (10,000) feet or more are being considered. The hydrostatic pressure at such water depths is very high and external pressure limitations have been set when subsea drilling operations are performed. However, an external, or reverse, pressure situation may occur under certain conditions, such as:

1. Flowline blowdown to the surface on a subsea gas producing well following shut-in at the well which may result in all well containment equipment exposed to external pressure from ambient hydrostatic head.
2. Blowdown to one atmosphere of the gas supply line on a "gas lifted" subsea well may subject all equipment exposed to gas lift line pressure to the external pressure gradient from ambient hydrostatic head.
3. Thermal cooling of produced fluids after well shut in can result in external pressure gradients from hydrostatic to enclosed volumes such as between valves.

Any "containment shell" seal which is exposed to external hydrostatic pressure and internal bore pressure from the well has the possibility of experiencing reverse pressure. Standard API type connections and gaskets are very likely suitable for withstanding reverse pressure due to their nature of being supported at both the seal outside and inside diameters. It is envisioned that the seal is "pressure enhanced" by both internal and external pressure.

Marine subsea connections typically use a tapered sealing gasket which is specifically designed to be retained by the upper connection half for underwater engagement through the use of an underwater remotely actuated connection. Such gaskets are pressure energized from internal pressure and ususally have a limited ability to withstand external pressure.

When a so-called reverse pressure occurs in which the external fluid pressure is substantially higher than the internal fluid pressure within the tubular member, leakage may occur at relatively low differential fluid pressures such as 200–300 psi, for example. It is desirable, particularly for subsea applications, that sealing means between hubs of adjacent tubular members seal against external fluid pressure as high as about 3500–4500 psi in order to be utilized for practically all subsea applications.

SUMMARY OF THE INVENTION

The present invention is particularly directed to a joint for a pair of tubular members having a gasket between the hubs of the tubular members capable of sealing at external fluid pressure as high as about 3500–4500 psi. Such a joint would be adequate for use at sea water depths of 7,500–10,000 feet. When the sealing means between the hubs of the tubular members includes an annular metal gasket, it is desirable that any sealing means for external fluid pressure permit leakage of internal fluid past the metal gasket which forms the primary seal at relatively low fluid pressures, such as 40–50 psi. Thus, the auxiliary or secondary sealing means for the joint would not prevent detection of leakage past the metal gasket in the event of failure of the metal gasket forming the primary seal from internal fluid pressure.

The present invention comprises a joint for the end hubs of a pair of axially aligned adjacent tubular members including a metal seal ring between the hubs to form a primary seal. The hubs have frusto-conical internal surfaces and the metal gasket or seal ring has mating frusto-conical external surfaces which form a metal-to-metal sealing relation for the primary seal. To adapt such a metal seal ring for sealing against very high external fluid pressures, such as 3500–4500 psi, an annular external projection or lip is provided centrally of the length of the metal gasket and projects between opposed spaced parallel surfaces of the opposing hubs to provide a support for a secondary or auxiliary seal. A pair of O-rings are mounted on the external projection for sealing against the opposed parallel surfaces of the hubs when external fluid pressure is greater than internal fluid pressure, and permitting leakage of fluid past the O-rings when the internal fluid pressure within the tubular members is greater than the external fluid pressure. Thus, when the tubular joint is located subsea at water depths where the external hydrostatic pressure is substantially greater than the internal fluid pressure, such as 3500 psi or greater, the secondary seal is effective to seal against the intrusion of sea water.

It is an object of the invention to provide a secondary sealing means for a tubular joint that is effective to prevent fluid leakage between hubs of the axial aligned tubular members from very high external fluid pressures while permitting leakage of internal fluid pressure from the tubular members.

It is a further object of this invention to provide such a secondary sealing means for a metal gasket between the hubs of the axial aligned tubular members, the secondary sealing means being particularly adapted for subsea applications at water depths over 4000 feet.

Other objects, features, and advantages of the invention will be apparent from the following specification and drawings.

DESCRIPTION OF THE INVENTION

Figure 1:
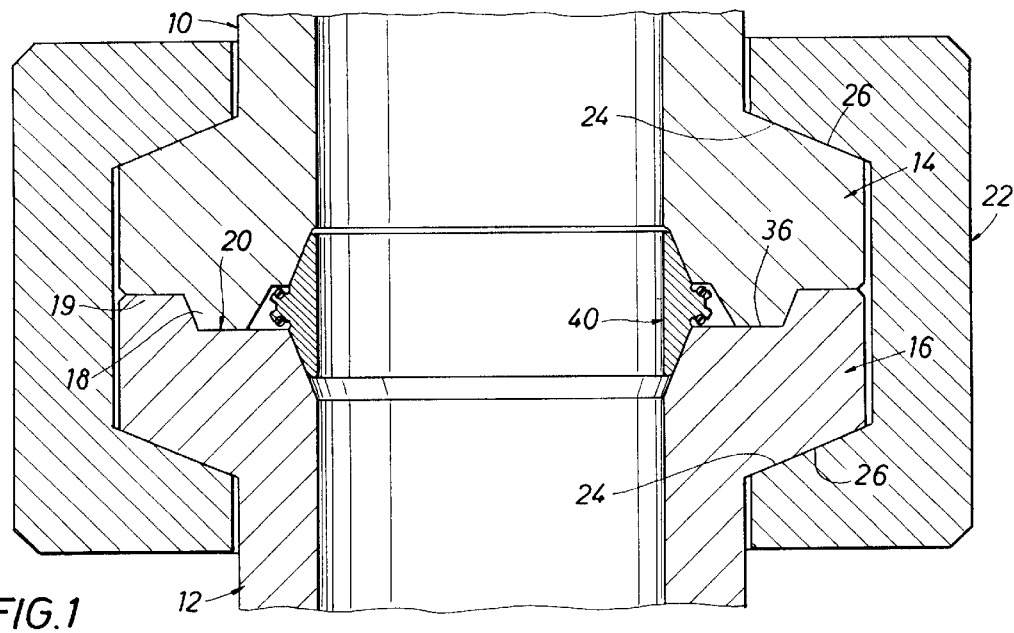
FIG. 1 is an enlarged sectional view of the joint forming the present invention illustrating a metal gasket between hubs of a pair of axial aligned tubular members clamped together by a clamp.
Figure 2:
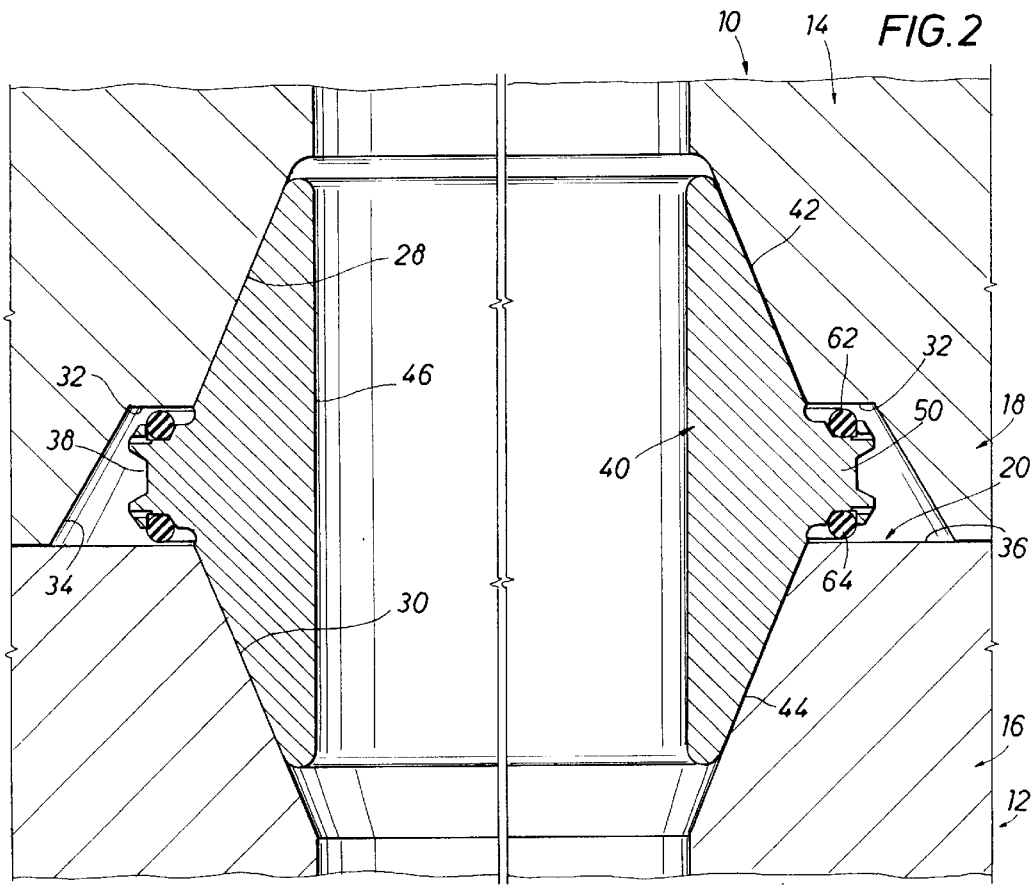
FIG. 2 is an enlarged fragment of FIG. 1 showing the metal gasket forming a primary metal-to-metal seal between the tubular members.

Referring now to the drawings for a better understanding of this invention, a pair of axially aligned tubular members are shown generally at 10 and 12 having respective end hubs 14 and 16. End hub 14 has an annular lip 18 fitting within an inner recess 20 adjacent rim 19 of hub 16.

A clamp or coupling generally indicated at 22 including a pair of halves pivotally connected to each other at one end and secured by flanges at the other end (not shown) as well known in the art. Clamp 22 has internal frusto-conical surfaces 24 engaging external frusto-conical surfaces 26 on hubs 14 and 16 to draw hubs 14 and 16 together when clamp 22 is tightened about hubs 14 and 16. Hubs 14 and 16 have respective internal frusto-conical surfaces 28 and 30. Hub 14 has an annular shoulder 32 connecting inner frusto-conical surface 28 and an outer frusto-conical surface 34. Recess 20 in hub 16 defines an inner end surface 36 extending in a spaced parallel relation to shoulder 32 perpendicular to the longitudinal axis of tubular members 10 and 12. An annular space 38 is formed between parallel shoulder 32 and parallel inner end surface 36.

Mounted between hubs 14 and 16 is a metal gasket or ring generally indicated at 40 and having outer frusto-conical surfaces 42, 44 in mating metal-to-metal sealing relation with respective frusto-conical surfaces 28 and 30 to form a primary seal upon tightening of clamp 22 about hubs 14 and 16.

Metal seal ring 40 has an axial surface 46 in axial alignment with the bores of tubular members 10 and 12. Clamp 22 is preferably of two halves with mating outwardly extending flanges (not shown) that are bolted together to press clamp 22 inwardly into tight relation with mating external tapered surfaces 26 on hubs 14 and 16 thereby to urge hubs 14 and 16 into tight sealing relation with metal gasket 40 compressed between hubs 14 and 16.

Figure 3:
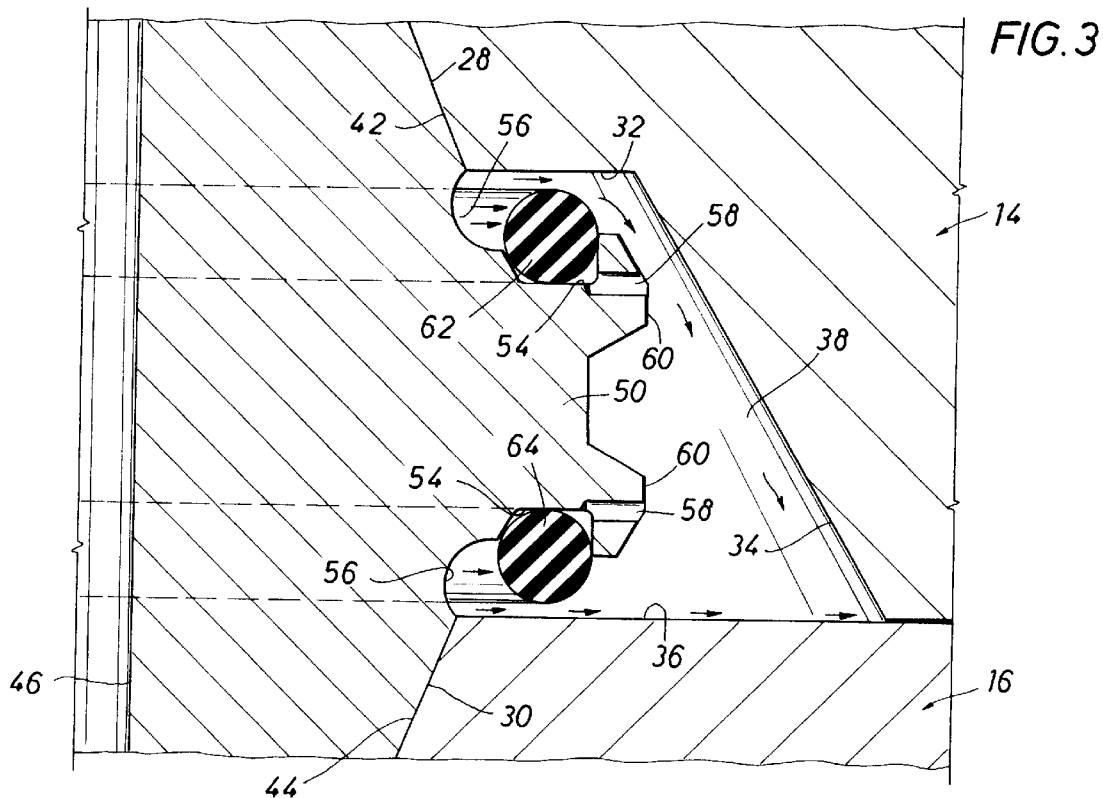
FIG. 3 is an enlarged sectional view of the secondary seal including a pair of O-rings on an external annular projection of the metal gasket and showing the O-rings in a position permitting fluid leakage when internal fluid pressure is greater than the external fluid pressure.
Figure 4:
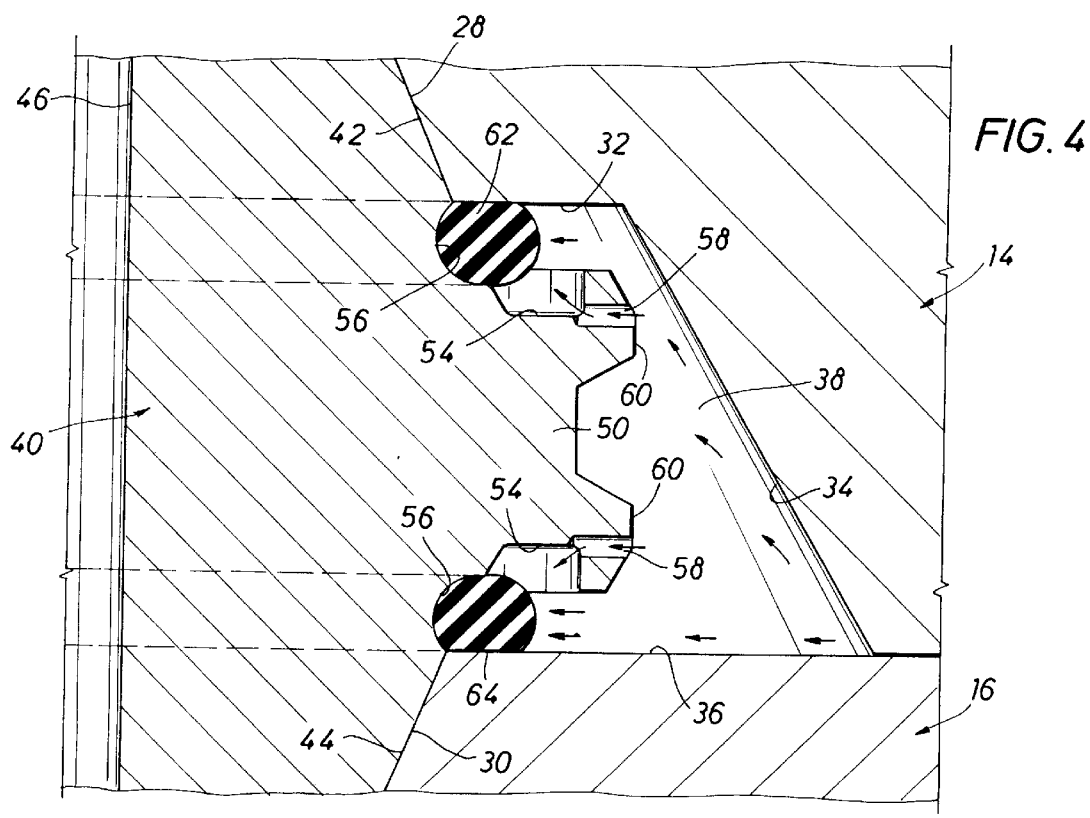
FIG. 4 is an enlarged sectional view similar to FIG. 3 but showing the O-rings in sealing relation between the hubs when the external fluid pressure is greater than the internal fluid pressure.

Metal seal ring 40 has an outer annular projection or lip 50 projecting radially outwardly from the body of seal ring 40 at the juncture of external frusto-conical surfaces 42 and 44. Radial projection 50 has on opposed sides thereof an annular groove having an inner groove portion 54 and an outer connecting grove portion 56. A plurality of ports 58 extend to groove portion 54 from the radially projecting end face 60 of annular projection 50. O-rings 62 and 64 are received by groove portions 54 as shown in FIG. 3 when internal fluid pressure is greater than external fluid pressure and leakage past metal gasket 40 occurs. Thus, a faulty gasket would be visually detected during testing or during operation. O-rings 62 and 64 are received by groove portions 56 when exposed to a positive external fluid pressure differential as shown in FIG. 4. Sealing surfaces 32 and 36 form secondary sealing surfaces radially outwardly of primary sealing surfaces 42 and 44 of hubs 14 and 16.

External fluid pressure through ports 58 urge O-rings 62, 64 outwardly from groove portions 54 into groove portions 56 in which position O-rings 62, 64 seal against parallel surfaces 32 and 36 of hubs 14 and 16 thereby to prevent any external fluid, such as sea water, from flowing into the bore of tubular members 10 and 12 past gasket 40. O-rings 62, 64 preferably have a Shore A durometer hardness of about 90. A Shore A durometer hardness between about 70 and 95 would function in a satisfactory manner. O-rings 62, 64 are preferably formed of a neoprene material. Other suitable materials for O-rings 62, 64 include nitrile-butadiene, natural rubber, fluorocarbon, and butyl rubber for example.

Gasket 40 may be of various diameters for utilization with subsea wellhead connections for casing having various diameters. Gasket 40 is preferably formed of an annealed stainless steel and is uncoated. O-rings 62, 64 are adapted for sealing against external fluid pressure at sea water depths as great as 7,500–10,000 feet and at hydrostatic fluid pressures as high as about 4500 psi to 5000 psi. Internal fluid pressure is easily vented past O-rings 62, 64 in the position of FIG. 3 in the event gasket 40 fails to retain the internal fluid pressure.

While O-rings have been illustrated for venting internal fluid pressure while sealing against external fluid pressure, it is to be understood that various other secondary seal means could be provided for metal gasket 40 within the scope of this invention. For example, a ball type check valve could be utilized in combination with O-rings to permit fluid flow to bypass the O-rings upon opening of the check valve from internal fluid pressure. The O-rings in such a design would seal against opposed hub surfaces at all times. It is apparent that various other types of secondary seal designs may be provided for the metal seal ring or gasket for the joint between tubular members in accord with this invention as defined in the claims.

What is claimed is:

1. A tubular joint comprising:
   a first tubular member having a tapered inner end surface;
   a second tubular member having a tapered inner end surface;
   means for joining said first and second tubular members in end to end relation with said tapered inner end surfaces adjacent each other;
   a seal ring positioned between said tapered inner end surfaces of said tubular members having tapered outer sealing surface in mating relation with said tapered inner end surfaces of said tubular members to form a primary seal upon joining of said first and second tubular members; and
   secondary seal means for said joint positioned on said seal ring radially outwardly of said tapered sealing surfaces of said seal ring, said secondary seal means including a fluid pressure responsive member movable in one direction to permit fluid flow past said secondary seal means outwardly from said seal ring and movable in another direction to prevent fluid flow inwardly past said secondary seal means.

2. A tubular joint as set forth in claim 1 wherein:
   each of said tubular members has an end hub defining said tapered inner end surface and further defining a secondary sealing surface radially outwardly of said seal ring;
   said secondary seal means sealing between said secondary sealing surfaces to prevent fluid flow inwardly past said seal ring.

3. A tubular joint as set forth in claim 2 wherein said secondary seal means permits fluid flow outwardly between said secondary sealing surfaces.

4. A tubular joint as set forth in claim 3 wherein said secondary sealing surfaces on said tubular members are in spaced relation to each other and extend in a direction generally transverse to the longitudinal axis of said tubular members, and said secondary seal means is positioned between said secondary surfaces for sealing therebetween against external fluid pressure.

5. A tubular joint as set forth in claim 2 wherein said secondary sealing surfaces are spaced from each other to define an annular space between said sealing surfaces; and said secondary seal means is positioned within said annular space.

6. A tubular joint as set forth in claim 5 wherein said seal ring has a radially extending projection thereon positioned centrally of the length of said seal ring and within the annular space between said secondary sealing surfaces, said secondary seal means positioned on said projection within said annular space.

7. In a tubular joint for a pair of tubular members having hubs in end to end relation with inner end tapered sealing surfaces thereon, a seal ring between said hubs having outer tapered sealing surfaces thereon in mating relation with said inner end sealing surfaces on said hubs to form a primary seal, and means for securing said hubs together in sealing relation with said seal ring; the improvement comprising:

secondary seal means positioned on said seal ring between said hubs radially outwardly of said tapered sealing surfaces and including fluid responsive means to permit fluid flow outwardly from said seal ring past said secondary seal means and to prevent fluid flow inwardly past said secondary seal means.

8. In a tubular joint as set forth in claim 7 wherein:

said hubs have opposed secondary sealing surfaces extending in a perpendicular direction to the longitudal axis of said tubular members; and said secondary seal means is positioned between said secondary sealing surfaces for sealing therebetween upon inward fluid flow toward said seal ring to block external fluid flow to said seal ring.

9. In a tubular joint as set forth in claim 7 wherein:

said hubs have opposed secondary sealing surfaces thereon, and elastomeric sealing means provide a secondary seal between said opposed secondary sealing surfaces.

10. A tubular joint comprising:

a first tubular member having an end hub defining a inner primary sealing surface;

a second tubular member having an end hub in opposed end to end relation to said first mentioned end hub and defining an inner primary sealing surface.

a seal ring between said primary sealing surfaces for forming a primary seal between said primary sealing surfaces;

each of said hubs having a secondary sealing surface positioned radially outwardly of said primary sealing surface; and secondary sealing means between said secondary sealing surfaces, said secondary seal means including a fluid pressure responsive member movable to one position permitting internal fluid flow outwardly of said seal ring and movable to another position blocking external fluid flow inwardly past said secondary sealing means.

11. A tubular joint as set forth in claim 10 wherein said seal ring has tapered external sealing surfaces engaging said primary sealing surfaces on said hubs in metal-to-metal sealing relation.

12. A tubular joint as set forth in claim 10 wherein said secondary sealing surfaces on said hubs comprise opposed surfaces extending in a transverse relation to the longitudinal axis of said tubular members; said secondary sealing means including elastomeric seal means for sealing between said secondary sealing surfaces.

13. A tubular joint as set forth in claim 12 wherein said secondary sealing means permits fluid flow outwardly from said seal ring past said elastomeric seal means and blocks fluid flow inwardly past said elastomeric seal means to said seal ring.

14. A tubular joint as set forth in claim 10 wherein said secondary sealing surfaces are in spaced opposed relation to each other, and said secondary sealing means is positioned between said secondary sealing surfaces.

15. A tubular joint as set forth in claim 14 wherein said seal ring has an annular projection intermediate its length extending radially between said secondary sealing surfaces; and a pair of O-rings are positioned on said projection in floating relation for sealing between said secondary sealing surfaces when exposed to external fluid flow and for permitting fluid flow outwardly past said O-rings when exposed to internal fluid flow from said seal ring.

16. A tubular joint comprising:

a first tubular member having a tapered inner end surface;

a second tubular member having a tapered inner end surface;

means for joining said first and second tubular members in end to end relation with said tapered inner end surfaces adjacent each other;

a seal ring positioned between said tapered inner end surfaces of said tubular members having tapered outer sealing surfaces in mating relation with said tapered inner end surfaces of said tubular members to form a primary seal upon joining of said first and second tubular members; said seal ring having a radially extending projection positioned centrally of the length of said seal ring; and secondary seal means for said joint positioned outwardly of said tapered sealing surfaces of said seal ring to permit fluid flow past said secondary seal means outwardly from said seal ring and to prevent fluid flow inwardly past said secondary seal means to said seal ring; said secondary seal means comprising a pair of O-rings positioned on opposed sides of said projection for sealing between said tubular members against external fluid flow; said O-rings being mounted for floating movement on said projection and moving out of contact with said tubular members when exposed to internal fluid pressure.

* * * * *